Nov. 26, 1957  J. L. BLAKE  2,814,124
INDICATOR DEVICE
Filed Dec. 12, 1955
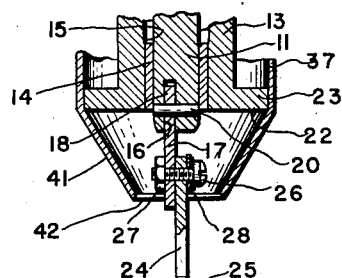
Fig. 2.
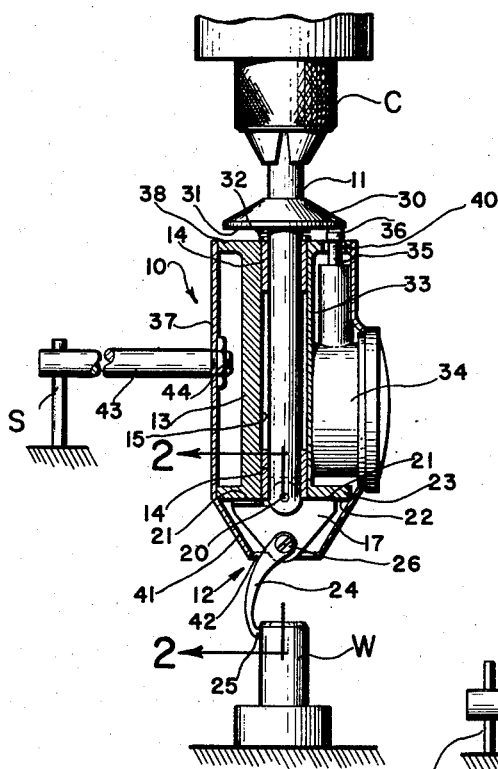
Fig. 1.
Fig. 3.
JOHN L. BLAKE,
INVENTOR
BY
AGENT

United States Patent Office 2,814,124
Patented Nov. 26, 1957

2,814,124
INDICATOR DEVICE
John L. Blake, Arcadia, Calif.

Application December 12, 1955, Serial No. 552,383

6 Claims. (Cl. 33—172)

This invention relates to an indicator device and relates more particularly to an apparatus for determining the condition of surfaces with respect to a fixed line, point or plane.

In many instances, it is desirable, and often absolutely necessary, that means be provided for determining conditions of eccentricity of a machine spindle. This desired function is particularly advantageous in making machine setups to provide a means for checking eccentricity or the offset of axes, and is an aid in setting to approach concentricity of a reference hole or pin in a workpiece with respect to a machine tool spindle. This action must preferably also be accomplished from one or more positions about a spindle axis.

Heretofore, operators of machines and the like have been required to follow an indicator around a spindle in order to read a dial from a number of positions. Obviously, such following of an indicator is often impossible, in some machine setup situations, and at the best is extremely inconvenient to the operator, requires considerably more time and accordingly increases the cost of components or parts being made on the machine by the operator.

Accordingly, therefore, the present invention has reference to a simplified device for use in correcting positions of a part on a machine as, for example, a jig borer or the like, and to approach concentricity of the part by observing a range of travel of an indicator while a spindle revolves and adjusting one horizontal table travel screw until the range of the indicator travel has been reduced to a point where travel has begun to increase, thus indicating that a part being centered has reached center from the direction of the beforementioned travel screw. The same procedure may thereafter be repeated with another normally disposed table travel screw, movement of which will cause the indicator travel range to diminish to zero, thus indicating that practical concentricity has been established.

The present invention finds particular utility as a device for determining conditions of dissymmetry or for determining degree of dissymmetry. Additionally, utility will be found for the device in determining out of round conditions, locating highs and lows of out of round conditions, detecting, locating and measuring surface taper with respect to axial travel of a spindle and generally providing an effective reading with an indicator shaft revolving unitarily with a machine spindle while a workpiece is stationary; or with both spindle and workpiece rotated in opposite directions; or with both spindle and workpiece revolving in the same direction at different speeds.

It is accordingly one important object of this invention to provide an indicating mechanism adapted for accomplishment of the foregoing and having none of the beforementioned disadvantages associated with prior devices designed for similar purposes.

It is another important object of the present invention to provide an indicating device that is simple in design, effective and efficient in use, rugged in construction and reliable in operation and wherein the chucking thereof need not be precisely established or exactly set.

It is another important object of this invention to provide an indicating device with which a relative general surface location may be obtained and which is a proportional and trigonometrically varying product.

Still another object of the invention is to provide a surface and axis indicator having universally adaptable features enabling use in a variety of setup situations.

Other and further important objects of the present invention will become apparent from disclosures in the following detailed specification, appended claims and accompanying drawing, wherein:

Figure 1 is a transverse sectional view through the surface and axis indicator of the present invention, showing the device in cooperation with a support and workpiece;

Fig. 2 is an enlarged fragmentary sectional view of a portion of the device as taken substantially as indicated by line 2—2, Fig. 1; and Fig. 3 is a sectional view similar to Fig. 1 showing a modified form of construction of the present indictor.

With reference to the drawing, the device of this invention is indicated generally at 10. The device further generally includes a shaft or spindle 11 and a feeler mechanism 12. The shaft 11 is designated and adapted to be supported as in a chuck C, or any other suitable holding mechanism, and may be either vertically, horizontally or otherwise disposed as desired for particular setup situations.

The indicator 10 includes the housing or body portion 13 having sleeve bearings 14 carried in a bore 15 therethrough. The shaft 11 is adapted for rotatable support within the bearings 14. One end of the shaft 11 is bifurcated as at 16 at one side of the axis of the shaft 11 for reception and support of a lever arrangement 17. The lever arrangement 17 has a semicircular tab portion 18 that is positioned within the bifurcation 16 and pivotally supported therein by means of a pin 20 which extends transversely through the shaft 11 and the tab 18. The lever 17 is generally triangular in configuration having surfaces or edge portions 21 that are adapted to bear against an end surface 22 of a radially outwardly extending flange 23 formed on the body 13. It is to be noted that the axis of the pin 20 normally lies in the plane of the surface 22 for a purpose to be hereinafter more fully described.

The lever 17 comprises a portion of the feeler mechanism 12. This structure further includes a feeler member 24 that is generally arcuate and has a slightly bulbous end portion 25. The feeler member 24 is mounted on the lever 17 and substantially on the axis of the shaft 11 in a frictional manner by means of a screw 26 and a nut 27, together with a friction washer 28 positioned beneath the head of the screw 26. The construction in this particular instance is such as to permit pivotal movement of the feeler member 24 with respect to the lever 17 when a deliberate effort is made to effect such movement. The connection and pivotal arrangement for the feeler member 24 is such, however, as normally to retain the feeler member in fixed relationship with respect to the lever 17.

A flange 30 is disposed adjacent to an end of the housing 13 remote from the feeler and contact arrangement 12, there being a compression spring 32 disposed between a radial surface 31 of the flange 30 and the end of the housing 13 or an axial end of one of the bearings 14. In this connection, it is to be understood that the compression spring 32 is not absolutely necessary in that when the device is used in a vertical position, as shown in the drawing, the weight thereof will gravitationally replace the spring 32 as far as the function of this spring is concerned.

With reference to Fig. 1, the body portion 13 has a longitudinally flattened area 33 on which a dial indicator 34 is mounted. The indicator 34 has an operating rod or member 35 and an end portion 36, the end portion 36 being adapted to bear against and cooperate with the radial surface 31 of the flange 30.

Thus, when the present device is supported in the chuck C, and the feeler 24 is positioned for contact with a workpiece W, rotation of the shaft or spindle 11 will also rotate the feeler 24 about the workpiece and any deviation from an axis of the shaft 11 will cause the feeler end portion 25 to move laterally whereby to effect movement of the housing 13 axially with respect to the shaft 11 and by action of the surfaces 21 of the lever 17 against the end surface 22 of the flange 23. The positioning of the axis of the pin 20 normally in the plane of the surface 22 reduces moments about the end of the shaft 11 and provides for more accurate use of and results from the present device. Upon upward axial movement of the housing 13 with respect to the shaft 11, the spring 32 will be compressed and the operating member or rod 35 of the indicator 34 will be moved relative to its casing whereby an indication of such movement will be provided by the dial of the indicator 34.

In some instances, it may be desirable to prevent dust, dirt, moisture and the like from entering the operating mechanism of the present device and a housing 37 may be positioned thereabout. One end of the housing 37 is adapted for contact with a flange 38 extending from and formed integrally with the body 13 on an end thereof remote from the flange 23. The flange 38 is provided with an opening 40 through which the operating rod 35 of the dial indicator 34 may extend. Another end of the housing 37 may be conically formed as at 41, with an enlarged opening 42 being retained at the bottom end thereof to permit operating space for the feeler 24 and lever 17. Additionally, while it is only necessary, to restrain the housing body and dial indicator against movement when the shaft 11 is rotating, manually to grip these items lightly, means are provided to limit such rotation as by a rod 43 which may be connected, by means of a nut 44, to the housing 37 and which extends laterally therefrom. The rod 43 acts as a rotation limiting member and is adapted for engagement with any fixed member S which may depend from adjacent portions of a machine with which the present device is being used.

While the present device is intended to provide an indication of out of round or eccentricity conditions, the movements of the feeler member 24 do not produce a type of deflection that can universally be indicated and precise indication as to the amount of movement for any particular setup is provided which serves for the purpose intended.

With reference now primarily to Fig. 3, wherein a modified form of the invention is shown, this modified form includes a shaft 50 that has one portion 51 of a body structure rotatably supported thereabout. The shaft has a flange 52 thereon that is adapted to bear against one end 53 of the body 51. The shaft 50 extends a substantial distance from another end 54 of the body 51, there being a collar or flange 55, forming another portion of the body structure, rotatably supported thereon as by means of a sleeve bearing 56. The collar 55 has a pair of flanges 57 and 58 on respective axial ends thereof, a compression spring 60 being positioned about the shaft 50 between the outer surface 61 of the flange 57 and the end surface 54 of the body 51. The shaft 50 has a lever 62 connected to one end thereof as by a pin 63 and has a lateral edge 64 that is adapted for cooperation with an end surface 65 of the flange 58. The lever 62 has a feeler member 66 frictionally mounted thereon as by means of a screw and nut arrangement 67, the feeler member having a bulbous end portion 68 that is adapted for cooperation with a workpiece W'.

The shaft 50 is adapted for support by means of a chuck C' or the like, there being a laterally extended stop member or rod 70 secured to and depended laterally outwardly from the body 51 and adapted for cooperation with a fixed stop member S'.

As shown, the housing 51 is adapted to support a rheostat 71, or the like device, having an operated member 72 that is adapted for frictional contact and cooperation with the surface 51 of the flange 57 carried by the collar 55. The rheostat 71 has leads 73 extended therefrom which may extend through a source of power 74 and thereafter to a remotely positioned indicator 75. By provision of this particular arrangement, any eccentricity or dissymmetry as determined by the feeler 66 may be reproduced at a remote location on an electrical dial of the indicator 75 for visual reading, or the leads 73 may be connected to a device providing a graphic recording, or further to suitable mechanism to pilot action by suitable servo-mechanism.

The operation of the device shown in Fig. 3 is substantially identical to that described in connection with the invention shown in Fig. 1 in that any lateral movement of the feeler member 66 will provide relative movement between the shaft 50 and the collar 55 which, for the present purpose, is considered a portion of the support body arrangement. This relative movement will effect movement of the rheostat 71 and provide the desired indication of movement of the feeler member 66. In this form of the invention, by making the indicator assembly axially stationary with only the feeler member lever and collar being movable, the pressure required to actuate the indicator is only that pressure inherent in the indicator, with no additional pressure being required to lift the indicator assembly, such additional pressure naturally tending to produce very slight lateral deflection in the main rotating shaft and associated small reading errors. In instances where high precision is required, such structure is advantageous; however, there is slight deviation from the extreme simplicity of the device shown in Fig. 1 which naturally tends toward a more complex design and associated increased manufacturing costs thereof.

Having thus described the invention and the present embodiments thereof, it is desired to emphasize the fact that many further modifications may be resorted to in a manner limited only by a just interpretation of the following claims.

I claim:

1. A surface and axis indicator comprising, in combination: a housing; means for limiting rotation of said housing; a shaft rotatably journalled in said housing; a lever pivotally connected with one end of said shaft; a feeler member frictionally adjustably carried by said lever; flange means carried by said shaft; compression spring means disposed between said flange means and said housing; a bearing surface on said flange means, a portion of said lever being adapted for engagement with said bearing surface, said pivotal connection between said lever and said shaft being on an axis normally lying in the plane of said bearing surface whereby to effect relative axial movement between said housing and said flange means upon deflection of said feeler member; and an axial movement indicating means at least partially carried by said housing for providing an indication of said deflection of said feeler member.

2. A direct operating surface and axis indicator comprising: an elongated housing; a shaft rotatably journalled in said housing, said housing having a radially disposed end surface; a lever member pivotally secured to one end of said shaft and having at least one laterally disposed wing portion normally engageable with said end surface of said housing a feeler member carried by said lever, a mounting axis of said feeler member being transversely disposed and passing through an axis of said shaft; a radially extending flange disposed outwardly from said shaft and adjacent an end of said housing remote from said end surface; a dial indicator carried by said housing and having an operating member disposed generally parallel to said axis of said shaft with an end thereof being adapted for sliding engagement with a radial extending surface of said flange, whereby to provide an indication of relative movement between said housing and said shaft, such movement being induced by tracing of said feeler over or about an irregular surface; and means for limiting rotational movement of said housing when torque is applied to said shaft.

3. A direct operating surface and axis indicator comprising: an elongated housing; a shaft rotatably journalled in said housing, said housing having a radially disposed end surface; a lever member pivotally secured to one end of said shaft and having at least one laterally disposed wing portion normally engageable with said end surface of said housing, the axis of said pivotal connection of said lever to said shaft lying normally in the plane of said surface; a feeler member carried by said lever, a mounting axis of said feeler member being transversely disposed and passing through an axis of said shaft; a radially extending flange disposed outwardly from said shaft and adjacent an end of said housing remote from said end surface; a dial indicator carried by said housing and having an operating member disposed generally parallel to said axis of said shaft with an end thereof being adapted for sliding engagement with a radially extending surface of said flange, whereby to provide an indication of relative movement between said housing and said shaft, such movement being induced by tracing of said feeler over or about an irregular surface; and means for limiting rotational movement of said housing when torque is applied to said shaft.

4. A direct operating surface and axis indicator comprising, in combination: an elongated housing; a shaft rotatably journalled in said housing, said housing having a radially disposed end surface; a lever member pivotally secured to one end of said shaft and having at least one laterally disposed wing portion normally engageable with said end surface of said housing; a feeler member carried by said lever, a mounting axis of said feeler member being transversely disposed and passing through an axis of said shaft; a radially extending flange disposed outwardly from said shaft and adjacent an end of said housing remote from said end surface; a compression spring disposed about said shaft between said flange and said housing; a dial indicator carried by said housing and having an operating member disposed generally parallel to said axis of said shaft with an end thereof being adapted for sliding engagement with a radially extending surface of said flange, whereby to provide an indication of relative movement between said housing and said shaft, such movement being induced by tracing of said feeler over or about an irregular surface; means for limiting rotational movement of said housing when torque is applied to said shaft; and an enclosure about said housing, lever and portions of said indicator.

5. A direct operating surface and axis indicator comprising, in combination: an elongated housing; a shaft rotatably journalled in said housing, said housing having a radially disposed end surface; a lever member pivotally secured to one end of said shaft and having at least one laterally disposed wing portion normally engageable with said end surface of said housing, the axis of said pivotal connection of said lever to said shaft lying normally in the plane of said surface; a feeler member carried by said lever, a mounting axis of said feeler member being transversely disposed and passing through an axis of said shaft; a radially extending flange disposed outwardly from said shaft and adjacent an end of said housing remote from said end surface; a dial indicator carried by said housing and having an operating member disposed generally parallel to said axis of said shaft with an end thereof being adapted for sliding engagement with a radially extending surface of said flange, whereby to provide an indication of relative movement between said housing and said shaft, such movement being induced by tracing of said feeler over or about an irregular surface; means for limiting rotational movement of said housing when torque is applied to said shaft; and an enclosure about said housing, lever and portions of said indicator.

6. A direct operating surface and axis indicator comprising, in combination: an elongated housing; a shaft rotatably journalled in said housing, said housing having a radially disposed end surface; a lever member pivotally secured to one end of said shaft and having at least one laterally disposed wing portion normally engageable with said end surface of said housing, the axis of said pivotal connection of said lever to said shaft lying normally in the plane of said surface; a feeler member frictionally adjustably carried by said lever, a mounting axis of said feeler member being transversely disposed and passing through an axis of said shaft; a radially extending flange disposed outwardly from said shaft and adjacent an end of said housing remote from said end surface; a compression spring disposed about said shaft between said flange and said housing; a dial indicator carried by said housing and having an operating member disposed generally parallel to said axis of said shaft with an end thereof being adapted for sliding engagement with a radially extending surface of said flange, whereby to provide an indication of relative movement between said housing and said shaft, such movement being induced by tracing of said feeler over or about an irregular surface; means for limiting rotational movement of said housing when torque is applied to said shaft; and an enclosure about said housing, lever and portions of said indicator.

References Cited in the file of this patent

UNITED STATES PATENTS

| | | |
|---|---|---|
| 1,019,400 | Zuegner et al. | Mar. 5, 1912 |
| 1,688,330 | Gunther et al. | Oct. 23, 1928 |
| 2,030,244 | Cox | Feb. 11, 1936 |
| 2,466,380 | Clark | Apr. 5, 1949 |